(12) United States Patent
Khandalkar et al.

(10) Patent No.: US 10,572,367 B2
(45) Date of Patent: Feb. 25, 2020

(54) INTELLIGENT CODE QUALITY MONITORING

(71) Applicant: Accenture Global Solutions Limited, Dublin (IE)

(72) Inventors: Prashant Narayanrao Khandalkar, Pune (IN); Vishal Bhatia, Ulhasnagar (IN); Prakhar Tripathi, Lucknow (IN); Rajni Kant Roy, Giridih (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 15/819,958

(22) Filed: Nov. 21, 2017

(65) Prior Publication Data

US 2019/0155715 A1 May 23, 2019

(51) Int. Cl.
*G06F 11/36* (2006.01)

(52) U.S. Cl.
CPC ...... *G06F 11/3608* (2013.01); *G06F 11/3684* (2013.01)

(58) Field of Classification Search
CPC ........ G06F 8/41–43; G06F 8/49; G06F 8/751; F06F 11/36–3684
See application file for complete search history.

(56) References Cited

U.S. PATENT DOCUMENTS

| | | | |
|---|---|---|---|
| 5,634,122 A * | 5/1997 | Loucks | G06F 9/52 |
| 6,212,675 B1 * | 4/2001 | Johnston | G06F 11/3664 714/38.14 |
| 7,043,230 B1 * | 5/2006 | Geddes | H04L 63/18 455/410 |
| 7,142,840 B1 * | 11/2006 | Geddes | H04L 63/0853 455/411 |
| 7,292,970 B1 * | 11/2007 | Hurlock | G01R 31/31835 703/13 |
| 8,719,789 B2 * | 5/2014 | Adler | G06F 11/3684 714/36 |
| 8,719,799 B2 * | 5/2014 | Adler | G06F 11/3676 714/36 |
| 8,880,889 B1 * | 11/2014 | Ward | H04L 63/0442 705/67 |
| 8,898,647 B2 * | 11/2014 | Sobolev | G06F 11/3676 717/130 |

(Continued)

*Primary Examiner* — S. Sough
*Assistant Examiner* — Zheng Wei
(74) *Attorney, Agent, or Firm* — Harrity & Harrity, LLP

(57) ABSTRACT

A device may receive, from a user device, a request for one or more code quality assessments of a program. The device may obtain authorization to access one or more environments associated with the program. The device may obtain one or more tokens that are associated with the one or more environments. The device may obtain a set of test classes for the program. The device may determine one or more code quality assessment scores by performing, for the program, a code quality assessment of the one or more code quality assessments. The device may perform the code quality assessment by accessing the one or more environments using the one or more tokens, executing the set of test classes in each environment, and determining the one or more code quality assessment scores. The device may provide the one or more code quality assessment scores to the user device.

20 Claims, 13 Drawing Sheets

(56) References Cited

U.S. PATENT DOCUMENTS

| | | | |
|---|---|---|---|
| 8,990,778 B1* | 3/2015 | Allocca | G06F 11/3692 717/126 |
| 9,032,373 B1* | 5/2015 | Gupta | G06F 11/3688 717/127 |
| 9,059,853 B1* | 6/2015 | Bortz | H04L 9/32 |
| 9,235,493 B2* | 1/2016 | Goetsch | G06F 11/3604 |
| 9,471,493 B2* | 10/2016 | Persson | G06F 12/0808 |
| 9,558,106 B1* | 1/2017 | Moniz | G06F 11/3692 |
| 9,779,232 B1* | 10/2017 | Paczkowski | G06F 21/45 |
| 9,880,921 B2* | 1/2018 | Bofferding | G06F 11/3604 |
| 10,037,263 B1* | 7/2018 | Kegley | G06F 11/3672 |
| 2002/0099952 A1 | 7/2002 | Lambert et al. | |
| 2003/0084041 A1* | 5/2003 | Dettinger | G06F 8/34 |
| 2005/0108682 A1* | 5/2005 | Piehler | G06F 8/33 717/110 |
| 2005/0160405 A1* | 7/2005 | Lunia | G06F 8/41 717/124 |
| 2005/0160411 A1 | 7/2005 | Sangal et al. | |
| 2007/0234309 A1* | 10/2007 | Davia | G06F 11/3644 717/130 |
| 2007/0250815 A1* | 10/2007 | Bendapudi | G06F 11/3676 717/124 |
| 2007/0294579 A1* | 12/2007 | Fay | G06F 11/26 714/30 |
| 2008/0301660 A1* | 12/2008 | Rao | G06F 8/65 717/170 |
| 2008/0301667 A1* | 12/2008 | Rao | G06F 8/65 717/172 |
| 2008/0301669 A1* | 12/2008 | Rao | G06F 8/65 717/173 |
| 2008/0301672 A1* | 12/2008 | Rao | G06F 8/61 717/177 |
| 2009/0007074 A1* | 1/2009 | Campion | G06F 9/5072 717/124 |
| 2009/0276419 A1* | 11/2009 | Jones | G06F 17/30637 |
| 2009/0287729 A1* | 11/2009 | Chen | G06F 11/3676 |
| 2010/0005346 A1* | 1/2010 | Hamlescher | G06Q 10/06 714/57 |
| 2010/0058295 A1* | 3/2010 | Johnson | G06F 11/3676 717/124 |
| 2010/0180258 A1* | 7/2010 | Takahashi | G06F 11/3616 717/124 |
| 2011/0047531 A1* | 2/2011 | Wang | G06F 11/3676 717/130 |
| 2011/0047532 A1* | 2/2011 | Wang | G06F 11/3676 717/130 |
| 2011/0271252 A1* | 11/2011 | Bnayahu | G06F 8/10 717/123 |
| 2011/0271253 A1* | 11/2011 | Bnayahu | G06F 8/10 717/123 |
| 2012/0331441 A1* | 12/2012 | Adamson | G06F 11/3664 717/102 |
| 2013/0091492 A1* | 4/2013 | Mizrahi | G06F 11/3676 717/124 |
| 2013/0117611 A1* | 5/2013 | Chakraborty | G06F 11/3672 714/33 |
| 2013/0212564 A1* | 8/2013 | Cai | G06F 11/3676 717/124 |
| 2013/0232472 A1* | 9/2013 | Korner | G06F 8/77 717/127 |
| 2014/0173563 A1* | 6/2014 | Dias | G06F 8/36 717/123 |
| 2014/0201703 A1* | 7/2014 | Boden | G06F 11/3676 717/101 |
| 2015/0026664 A1* | 1/2015 | Bartley | G06F 11/3676 717/124 |
| 2015/0332055 A1 | 11/2015 | Siman | |
| 2016/0162387 A1* | 6/2016 | Arguelles | G06F 11/3676 717/125 |
| 2016/0306690 A1* | 10/2016 | Underseth | G06F 11/263 |
| 2016/0366151 A1* | 12/2016 | Tamura | H04L 63/0807 |
| 2016/0371617 A1* | 12/2016 | Mullaney | G06Q 10/0635 |
| 2017/0075791 A1* | 3/2017 | Ramakrishna | G06F 11/3664 |
| 2017/0075794 A1* | 3/2017 | Ramakrishna | G06F 11/3692 |
| 2017/0083430 A1* | 3/2017 | Meerovich | G06F 11/3676 |
| 2017/0091078 A1* | 3/2017 | Atyam | G06F 11/3616 |
| 2017/0153969 A1* | 6/2017 | Kshirsagar | G06F 11/3688 |
| 2017/0249231 A1* | 8/2017 | Bofferding | G06F 11/3604 |
| 2017/0278421 A1 | 9/2017 | Du et al. | |
| 2018/0041891 A1* | 2/2018 | Bleyl | H04W 8/18 |
| 2018/0054449 A1* | 2/2018 | Nandha Premnath | G06F 21/566 |
| 2018/0082057 A1* | 3/2018 | LeMay | G06F 21/54 |
| 2018/0114030 A1* | 4/2018 | Sullivan | G06F 21/6218 |

\* cited by examiner

INTELLIGENT CODE QUALITY MONITORING

BACKGROUND

In computer science, software quality assurance (SQA) involves utilizing one or more code quality assessment techniques to ensure that a program meets a particular standard of quality. For example, a code coverage assessment may be used to measure a degree to which the source code of a program is executed when a particular test suite runs. A program with high code coverage has had more source code executed during testing which suggests that the program has a lower chance of containing undetected software bugs compared to a program with low code coverage.

SUMMARY

According to some possible implementations, a device may receive, from a user device, a request for a code quality assessment of a program. The request may include program identifier information and program environment information for a plurality of environments associated with the program. The device may obtain, using the program environment information, authorization to access the plurality of environments associated with the program. The device, when obtaining the authorization, may obtain a set of tokens that are associated with the plurality of environments. The device may obtain, using the program identifier information, a set of test classes for the program. The device may determine a set of code quality assessment scores by performing the code quality assessment for the program. The device, when performing the code quality assessment, may access the plurality of environments using the set of tokens, execute the set of test classes in each environment of the plurality of environments, and determine a code quality assessment score for the program in each environment of the plurality of environments. The device may provide the set of code quality assessment scores to the user device.

According to some possible implementations, a non-transitory computer-readable medium may store one or more instructions that, when executed by one or more processors, cause the one or more processors to receive, from a user device, a request for a code quality assessment of a program. The one or more instructions may cause the one or more processors to obtain, using information included in the request, authorization to access one or more environments associated with the program by obtaining one or more tokens that are associated with the one or more environments. The one or more instructions may cause the one or more processors to obtain, using information included in the request, a set of test classes for the program. The one or more instructions may cause the one or more processors to provide the one or more tokens for the one or more environments and the set of test classes to a server device to permit the server device to use the one or more tokens to access the one or more environments, execute the set of test classes in each environment of the one or more environments, determine one or more code quality assessment scores for the program, and output the one or more code quality assessment scores for the program. The one or more instructions may cause the one or more processors to receive the one or more code quality assessment scores. The one or more instructions may cause the one or more processors to provide the one or more code quality assessment scores to the user device.

According to some possible implementations, a method may include receiving, by a device and from a user device, a request for one or more code quality assessments of a program. The method may include obtaining, by the device and by using information included in the request, authorization to access one or more environments associated with the program. The device may, while obtaining the authorization, obtain one or more tokens that are associated with the one or more environments. The method may include obtaining, by the device and by using information included in the request, a set of test classes for the program. The method may include determining, by the device, one or more code quality assessment scores by performing, for the program, a code quality assessment of the one or more code quality assessments. The device, while performing the code quality assessment, may access the one or more environments using the one or more tokens, execute the set of test classes in each environment of the one or more environments, and determine the one or more code quality assessment scores. The method may include providing, by the device, the one or more code quality assessment scores to the user device.

DETAILED DESCRIPTION

Figure 1A:
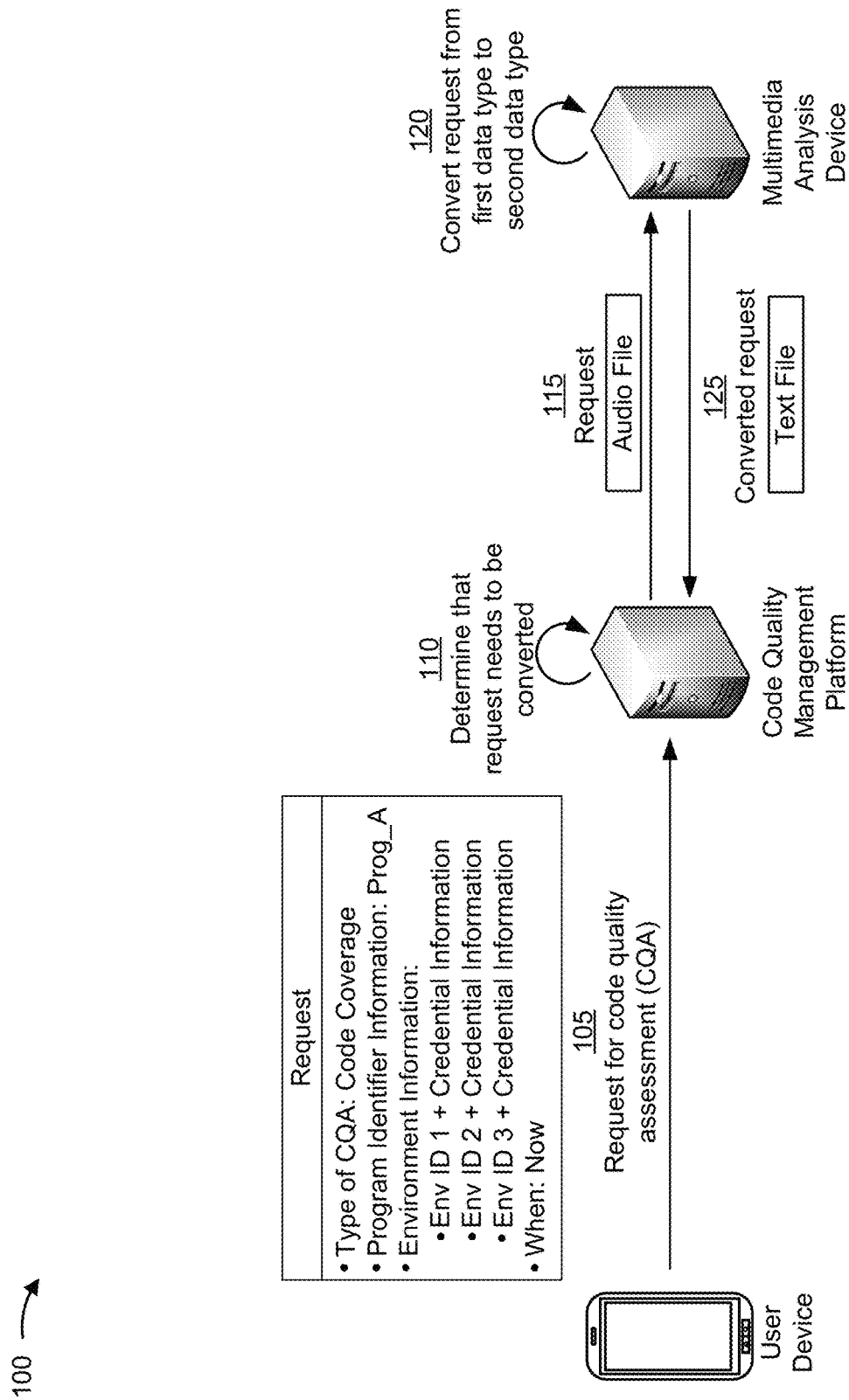
FIGS. 1A-1D are diagrams of an overview of an example implementation described herein.

The following detailed description of example implementations refers to the accompanying drawings. The same reference numbers in different drawings may identify the same or similar elements.

Software quality assurance (SQA) involves using one or more code quality assessment techniques to ensure that a program meets a particular standard of quality. For example, a code coverage assessment may be used to determine a degree to which source code of the program has been tested. In this case, the program may be tested by program testers using a set of test cases, and the code coverage assessment may be used to determine a percentage of source code that has been tested via the set of test cases.

However, the code coverage assessment may need to be manually executed, which may be time consuming and prone to user error. Additionally, while creating and releasing the program, the program may be hosted or supported in different environments (e.g., a development environment, a testing environment, a production environment, etc.), and the code coverage assessment may not be compatible with or capable of executing in each environment.

Some implementations described herein provide a code quality management platform to automatically perform or to automatically orchestrate performance of one or more code quality assessments for a program in one or more environments. For example, a code quality management platform may receive a request from a user device for a code quality assessment of a program. The request may be a request to perform the code quality assessment immediately or may be a request to schedule the code quality assessment for a particular time period. In this case, the code quality management platform may obtain authorization to access one or more environments associated with the program. Additionally, the code quality management platform may obtain a set of test classes that may be executed to perform the code quality assessment for the program. Furthermore, the code quality management platform may perform the code quality assessment for the program, and may provide, to the user device, one or more code quality assessment scores and/or one or more summary statistics relating to the code quality assessment of the program.

In this way, the code quality management platform conserves processing resources by eliminating a need to process separate requests each time a user needs to have a code quality assessment performed. For example, the user may, in one request, schedule multiple code quality assessments for the program or may schedule code quality assessments for multiple programs, thereby conserving processing resources of the code quality management platform that might otherwise be used to process separate requests.

FIGS. 1A-1D are diagrams of an overview of an example implementation 100 described herein. As shown in FIGS. 1A-1D, example implementation 100 may include a code quality management platform that automatically performs a code quality assessment for a program.

As shown in FIG. 1A, and by reference number 105, the code quality management platform may receive, from a user device, a request for a code quality assessment for the program. The request may include information indicating a type of code quality assessment, program identifier information, program environment information (e.g., indicating which environments are to be used for the code quality assessment, credential information needed to request access to the environments, etc.), project deadline information, time information (e.g., indicating to perform the code quality assessment immediately, at a particular time period, at a particular reoccurring interval, etc.), and/or the like.

Shown as an example, the request may include a type of code quality assessment (shown as a code coverage assessment), a program identifier (shown as "Prog_A"), program environment information (shown as environment identifier 1 through environment identifier 3 with corresponding credential information), time information indicating to perform the code coverage assessment immediately (shown as "now"), and/or the like.

In some implementations, the user device may provide the request using a multitude of different messaging services. For example, the user device may provide the request using a messaging service that supports text-based messages (e.g., a short message service (SMS), an e-mail service, etc.), a messaging service that supports voice messages, a messaging service that supports media messages, and/or the like. In this case, the user device may host an application that uses a virtual agent to interact with a particular messaging service that is being used to provide the request.

As an example, the user device may use a messaging service that supports voice messages to provide the request. To configure the user device to be able to provide the request via the messaging service, a user may interact with the virtual agent of the application to select the messaging service as the service preferred for making requests. In this case, the virtual agent may add a registered phone number to a contacts list stored on the user device. In this way, the user may call the phone number and leave a voicemail with the request. Furthermore, the information stored via the voicemail may be provided to the code quality management platform for further processing.

As shown by reference number 110, the code quality management platform may determine that the request needs to be converted. For example, the code quality management platform may analyze a data type of the request, and may determine that the request is of a data type that needs to be converted. In this case, the code quality management platform may determine that the request is of a first data type (shown as an audio file), which may need to be converted to a second data type (e.g., a text file) for further processing.

As shown by reference number 115, the code quality management platform may provide the request to a multimedia analysis device. As shown by reference number 120, the multimedia analysis device may convert the request from the first data type (e.g., the audio file) to the second data type (e.g., the text file). As shown by reference number 125, the multimedia analysis device may provide the converted request (e.g., the request as the text file) to the code quality management platform.

In this way, the code quality management platform is able to receive a request for a code quality assessment of the program. Furthermore, by using a virtual agent to support transmission of requests via a multitude of different types of messaging services, the code quality management platform improves accessibility and flexibility of scheduling and requesting code quality assessments. Additionally, use of the virtual agent increases productivity of workers, reduces user error, and/or the like.

Figure 1B:
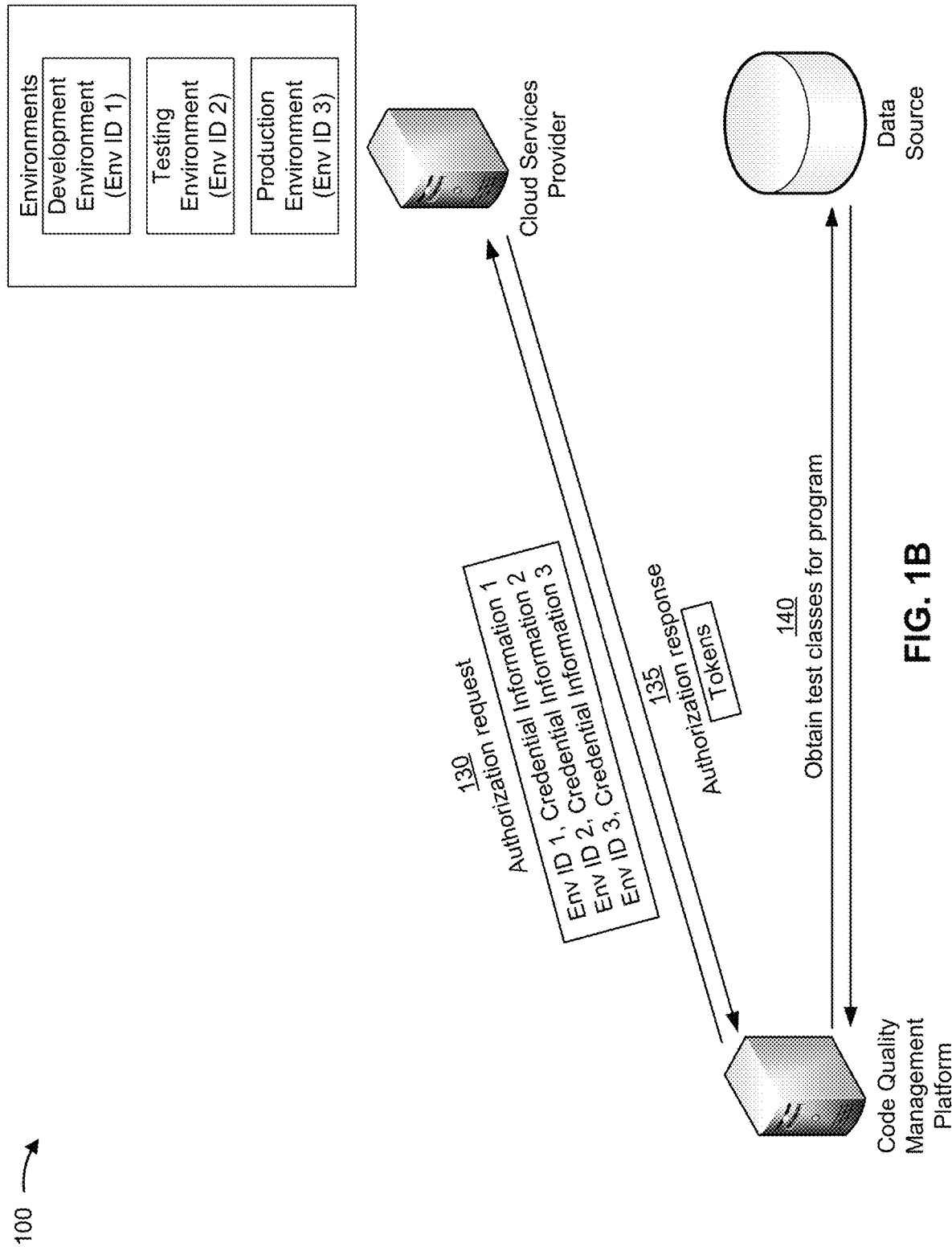

As shown in FIG. 1B, and by reference number 130, the code quality management platform may provide an authorization request to a cloud services provider that supports the one or more environments. For example, as shown, the code quality management platform may provide an authorization request to access a development environment, a testing environment, and a production environment. In this case, the authorization request may include environment identifiers and credential information needed to access each environment.

As shown by reference number 135, the code quality management platform may receive an authorization response indicating whether the authorization succeeded. For example, the cloud services provider may execute an authorization procedure by comparing the credential information included in the authorization request to credentials needed to access each environment. In this case, if credential information for a particular environment matches the credentials needed to access the particular environment, then the cloud services provider may provide an authorization response to the code quality management platform indicating that the authorization succeeded. In this case, the authorization response may include a security token that allows the code quality management platform to access the particular environment.

In some implementations, the code quality management platform may store the security token for each environment. For example, the code quality management platform may store the security token for each environment such that the code quality management platform does not need to provide an authorization request each time the user device requests a code quality assessment for the program. In this way, the code quality management platform conserves processing resources and/or network resources that might otherwise be used to obtain authorization to the environments during subsequent user requests.

As shown by reference number 140, the code quality management platform may obtain, from a data source, a set of test classes that may be used to perform the code quality assessment, as described further herein.

In this way, the code quality management platform may obtain authorization to access one or more environments associated with the program and may obtain a set of test classes that may be used to perform the code quality assessment for the program.

Figure 1C:
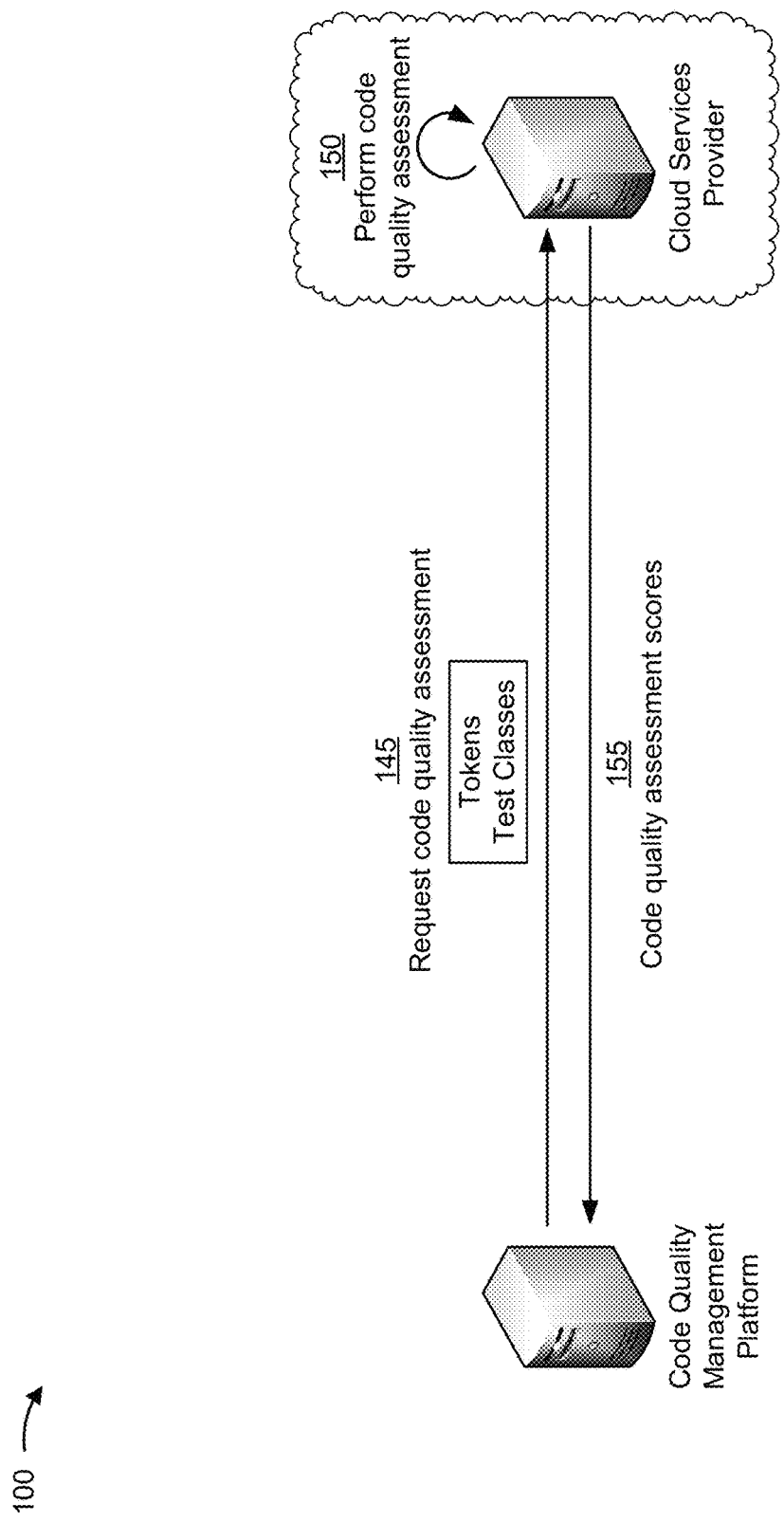

As shown in FIG. 1C, and by reference number 145, the code quality management platform may provide, to the cloud services provider, a request to perform the code quality assessment. For example, the code quality management platform may use an application programming interface (API) to request the code quality assessment. In this case, the request may include the one or more security tokens and the set of test classes.

As shown by reference number 150, the cloud services provider may perform the code quality assessment. For example, the cloud services provider may perform the code quality assessment in each environment, of the one or more environments, using the one or more security tokens and the set of test classes. In this case, the code quality assessment may output one or more code quality assessment scores (e.g., one score for each environment of the one or more environments).

As an example, the cloud services provider may use the one or more security tokens and the set of test classes to perform a code coverage assessment in the development environment, the testing environment, and the production environment. For example, the cloud services provider may access the development environment using a security token associated with the development environment, and may execute the set of test classes in the development environment. While the set of test classes are executing, the code coverage assessment may be performed to determine a percentage of program code that is used during execution of the set of test classes. In this case, the percentage of the program code that is used during execution of the set of test classes may be used as a code coverage assessment score. In some implementations, the cloud services provider may concurrently perform the code coverage assessment in two or more different environments. In some implementations, the cloud services provider may perform the code coverage assessment in one environment at a time.

As shown by reference number 155, the code quality management platform may receive the one or more of code quality assessment scores. For example, the cloud services provider may provide, to the code quality management platform, a code quality assessment score for the development environment, a code quality assessment score for the production environment, and a code quality assessment score for the production environment.

In some implementations, the code quality management platform may perform the code quality assessment rather than the cloud services provider performing the code quality assessment. For example, the code quality management platform may perform the code quality assessment for one or more environments locally, in a similar manner to that described above. By performing a code quality assessment locally, the code quality management platform may conserve communication resources and network resources that would be used when the code quality assessment is performed by the cloud services provider.

In this way, the code quality management platform is able to perform, or orchestrate performance of, the code quality assessment for the program.

Figure 1D:
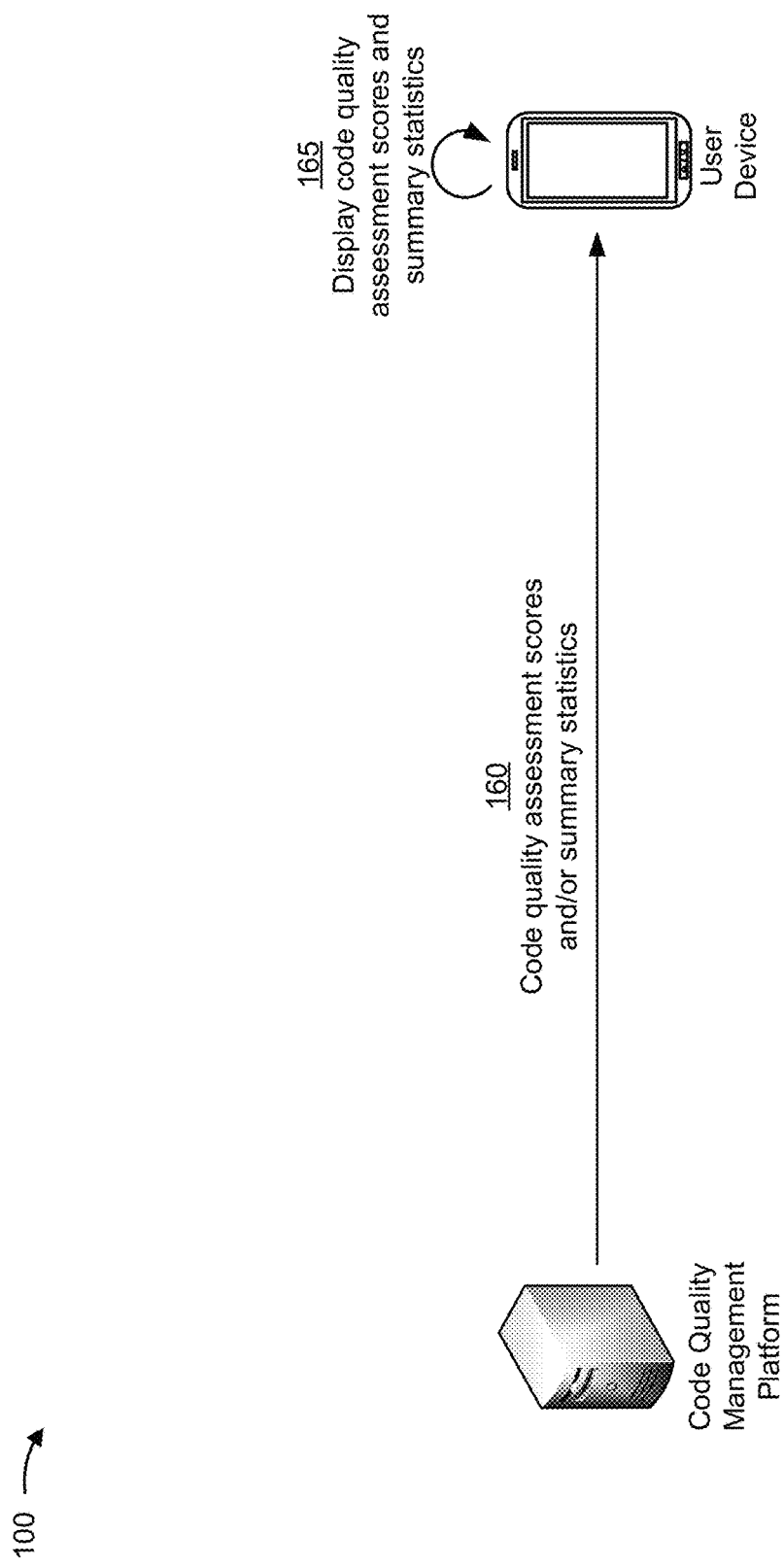

As shown in FIG. 1D, and by reference number 160, the code quality management platform may provide the one or more code quality assessment scores and/or one or more summary statistics to the user device. The one or more summary statistics may include a summary of code quality assessment scores for the program (e.g., showing a score for each environment, showing a score for the same environment but for multiple assessments that were made over an interval, etc.), code quality assessment scores for the program in relation to other programs, and/or the like. As shown by reference number 165, the user device may display the code quality assessment scores and/or the one or more summary statistics on a user interface.

In this way, the code quality management platform is able to provide code quality assessment scores and/or summary statistics for display on the user interface of the user device.

As indicated above, FIGS. 1A-1D are provided merely as an example. Other examples are possible and may differ from what was described with regard to FIGS. 1A-1D. For example, while the request shown in FIGS. 1A-1D is a request for a code coverage assessment, in practice, the request can be a request for a number of different types of code quality assessments, such as a request for a code duplication assessment, a request for a code errors detection assessment, a lines of code (LOC) assessment, a cyclomatic complexity assessment, and/or the like.

In this way, the code quality management platform is able to automatically perform or orchestrate performance of a code quality assessment of a program. Furthermore, manual execution of code quality assessments can lead to user errors. As such, the code quality management platform conserves processing resources that might otherwise be used to execute error correction techniques.

Figure 2:
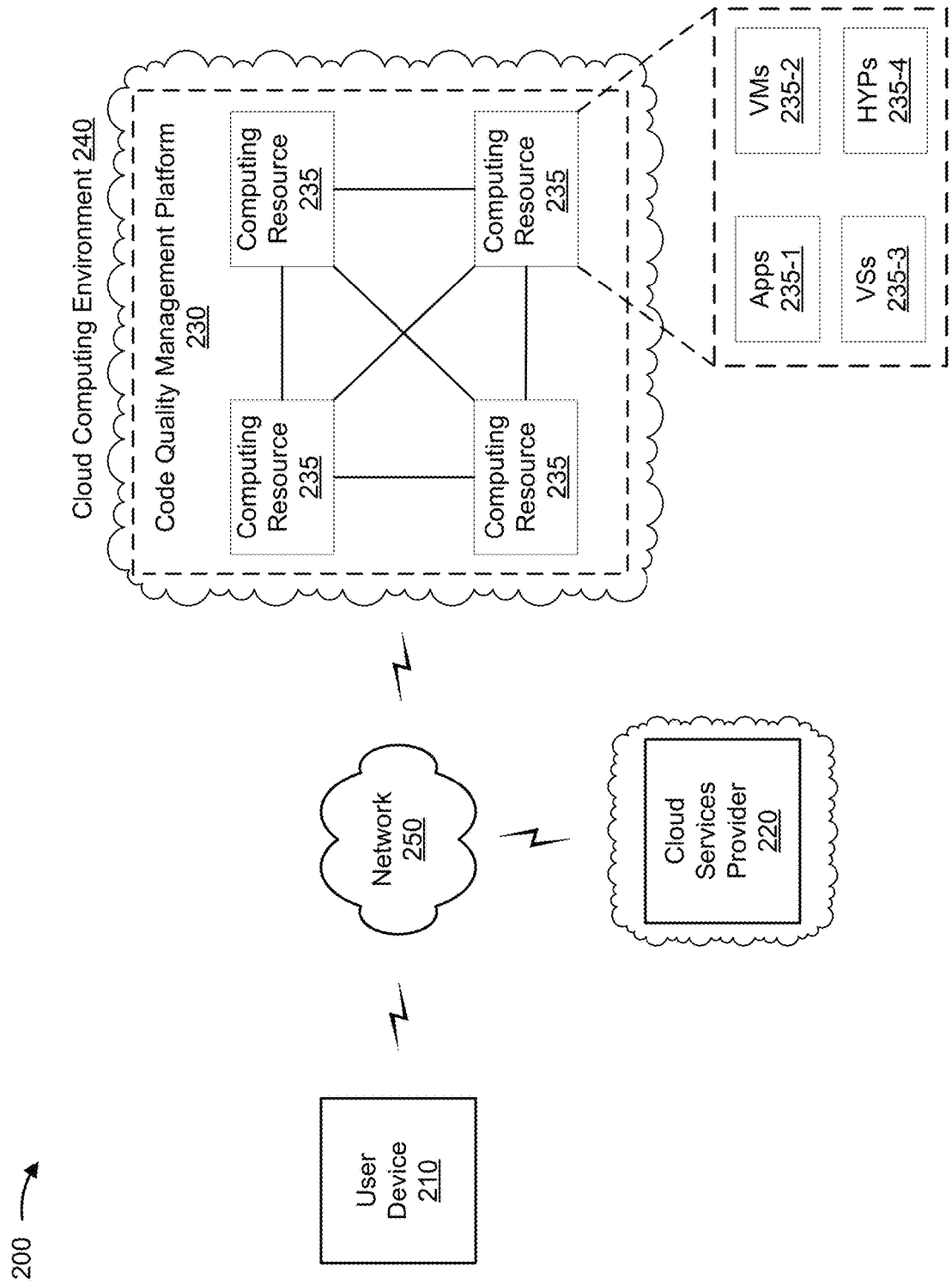
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a cloud services provider 220, a code quality management platform 230 hosted by a cloud computing environment 240, and/or a network 250. Devices of environment 200 may interconnect via wired connections, wireless connections, or a combination of wired and wireless connections.

User device 210 includes one or more devices capable of receiving, storing, generating, processing, and/or providing information associated with a code quality assessment. For example, user device 210 may include a communication and/or computing device, such as a phone (e.g., a mobile phone, such as a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, user device 210 may provide, to code quality management platform 230, a request for a code quality assessment. In some implementations, user device 210 may receive, from code quality management platform 230, one or more code quality assessment scores (e.g., one or more code coverage scores).

Cloud services provider 220 includes one or more devices capable of receiving, storing, generating, processing, and/or providing information associated with a code quality assessment. For example, cloud services provider 220 includes a server device or a group of server devices.

In some implementations, cloud services provider 220 may receive, from code quality management platform 230, a request for authorization information for one or more environments. In some implementations, cloud services provider 220 may provide an authorization response to code quality management platform 230. In some implementations, cloud services provider 220 may receive, from code quality management platform 230, authorization information and/or a set of test classes associated with a request for a code quality assessment (e.g., using one or more application programming interfaces). In some implementations, cloud services provider 220 may provide one or more code quality assessment scores (e.g., code coverage scores) to code quality management platform 230.

Code quality management platform 230 includes one or more devices capable of receiving, storing, generating, processing, and/or providing information associated with a code quality assessment. For example, code quality management platform 230 may include a server device (e.g., a host server, a web server, an application server, etc.), a data center device, or a similar device. In some implementations, code quality management platform 230 may obtain a set of test classes from a data source. In some implementations, code quality management platform 230 may perform one or more functions performed by cloud services provider 220. For example, code quality management platform 230 may determine one or more code quality assessment scores.

In some implementations, as shown, code quality management platform 230 may be hosted in cloud computing environment 240. Notably, while implementations described herein describe code quality management platform 230 as being hosted in cloud computing environment 240, in some implementations, code quality management platform 230 might not be cloud-based (i.e., may be implemented outside of a cloud computing environment) or might be partially cloud-based.

Cloud computing environment 240 includes an environment that hosts code quality management platform 230. Cloud computing environment 240 may provide computation, software, data access, storage, and/or other services that do not require end-user knowledge of a physical location and configuration of system(s) and/or device(s) that host code quality management platform 230. As shown, cloud computing environment 240 may include a group of computing resource 235 (referred to collectively as "computing resources 235 and individually as "computing resource 235").

Computing resource 235 includes one or more personal computers, workstation computers, server devices, or another type of computation and/or communication device. In some implementations, computing resource 235 may host code quality management platform 230. The cloud resources may include compute instances executing in computing resource 235, storage devices provided in computing resource 235, data transfer devices provided by computing resource 235, etc. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications that may be provided to or accessed by user device 210. Application 235-1 may eliminate a need to install and execute the software applications on user device 210. For example, application 235-1 may include software associated with code quality management platform 230 and/or any other software capable of being provided via cloud computing environment 240. In some implementations, one application 235-1 may send/receive information to/from one or more other applications 235-1, via virtual machine 235-2.

Virtual machine 235-2 includes a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program, and may support a single process. In some implementations, virtual machine 235-2 may execute on behalf of a user (e.g., user device 210), and may manage infrastructure of cloud computing environment 240, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 may present a virtual operating platform to the guest operating systems, and may manage the execution of the guest operating systems. Multiple instances of a variety of operating systems may share virtualized hardware resources.

Network 250 includes one or more wired and/or wireless networks. For example, network 250 may include a cellular network (e.g., a fifth generation (5G) network, a fourth generation (4G) network, such as a long-term evolution (LTE) network, a third generation (3G) network, a code division multiple access (CDMA) network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
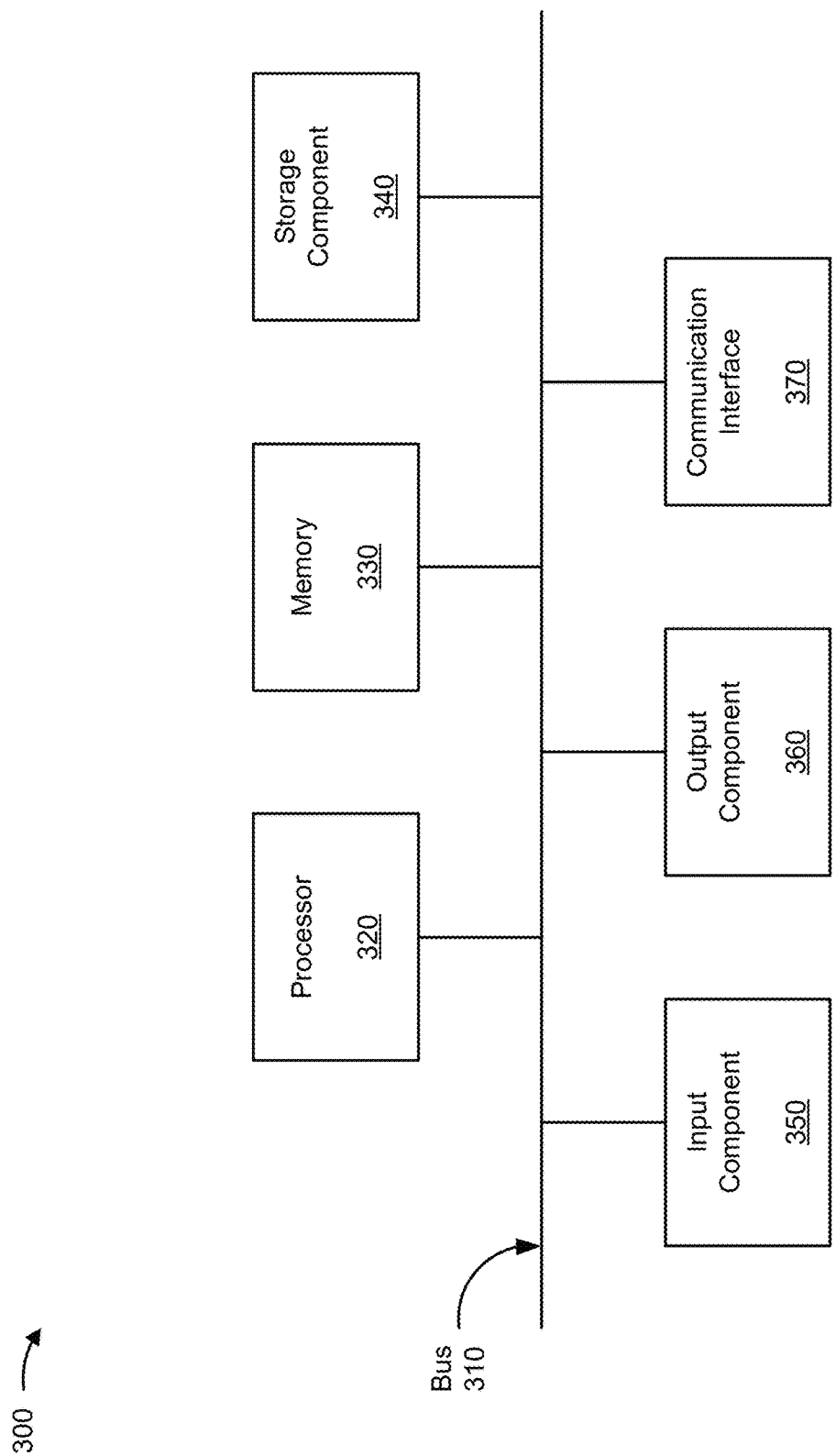
FIG. 3 is a diagram of example components of one or more devices of FIG. 2.

FIG. 3 is a diagram of example components of a device 300. Device 300 may correspond to user device 210, cloud services provider 220, and/or code quality management platform 230. In some implementations, user device 210, cloud services provider 220, and/or code quality management platform 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
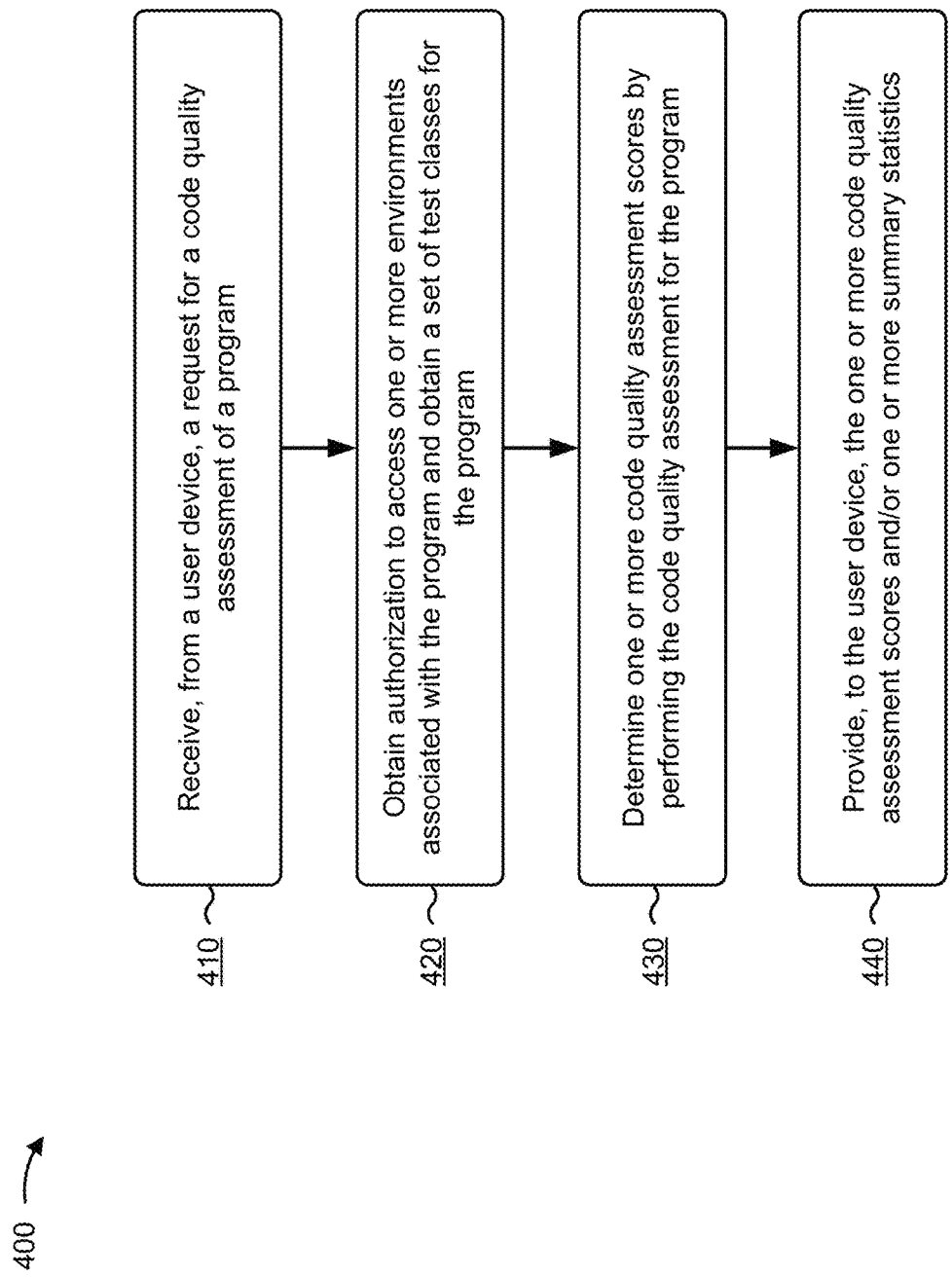
FIG. 4 is a flow chart of an example process for performing or orchestrating performance of one or more code quality assessments of a program that operates in one or more environments.

FIG. 4 is a flow chart of an example process 400 for performing or orchestrating performance of one or more code quality assessments of a program that operates in one or more environments. In some implementations, one or more process blocks of FIG. 4 may be performed by code quality management platform 230. In some implementations, one or more process blocks of FIG. 4 may be performed by another device or a group of devices separate from or including code quality management platform 230, such as user device 210 and/or cloud services provider 220.

As shown in FIG. 4, process 400 may include receiving, from a user device, a request for a code quality assessment of a program (block 410). For example, code quality management platform 230 may receive, from user device 210, a request for a code quality assessment of a program, such as a request for a code coverage assessment, a code duplication assessment, a code errors detection assessment, a lines of code (LOC) assessment, a cyclomatic complexity assessment, and/or the like. The request may include information indicating a type of code quality assessment, program identifier information, program environment information (e.g., indicating which environments are to be used for the code quality assessment, credential information needed to request access to the environments, etc.), project deadline information, time information (e.g., indicating to perform the code quality assessment immediately, at a particular time period, at a particular reoccurring interval, etc.), and/or the like.

In some implementations, user device 210 may provide a request for a code quality assessment using a multitude of different messaging services. For example, user device 210 may provide a request to code quality management platform 230 using a messaging service that supports text-based messages (e.g., an e-mail service, an SMS service, etc.), a messaging service that supports voice messages, a messaging service that supports media messages, and/or the like. In this case, an application may be hosted on a user device 210 that uses a virtual agent to interact with a particular messaging service to allow user device 210 to use the particular messaging service to provide the request.

As an example, user device 210 may provide the request to code quality management platform 230 using an SMS service. To configure user device 210 to be able to provide the request via the SMS service, a user may interact with the virtual agent of the application to select the messaging service as the service preferred for making requests. In this case, the virtual agent may add a contact to a list of contracts stored on user device 210. In this way, the user may text the request to the contact stored on user device 210, and the request may be forwarded to code quality management platform 230.

As another example, user device 210 may provide the request to code quality management platform 230 using a messaging service that supports voice or media messages. To configure user device 210 to be able to provide the request via the messaging service that supports voice or media messages, a user may interact with the virtual agent of the application to select the messaging service as the service preferred for making requests. In this case, the virtual agent may create an account for the messaging service, such that user device 210 can use the account as a recipient for the request. In this way, the user may launch the messaging service that supports the voice or the media messages, may select the account, and may provide the request to the account (e.g., which may be a voice message or a media message), and the request may be forwarded to code quality management platform 230.

In some implementations, code quality management platform 230 may convert the request to a uniform data type. For example, different messaging services may support communication of different data types, which may cause code quality management platform 230 to receive requests in different file types, file formats, and/or the like. In this case, code quality management platform 230 may standardize the request into a uniform data type (e.g. file type, file format, etc.). As an example, code quality management platform 230 may receive a request in a first file type (e.g., an audio file, a media file), and may convert the request to a second file type (e.g., a text file) that is easier to be processed.

In some implementations, code quality management platform 230 may receive a request to schedule the code quality assessment. For example, code quality management platform 230 may receive a request to schedule the code quality assessment for a particular time period, for a particular interval, and/or the like. In some implementations, code quality management platform 230 may receive a request to schedule the code quality assessment for one or more programs, for one or more environments, for a set of test classes, and/or the like.

By allowing user device 210 to schedule code quality assessments, code quality management platform 230 is able to automatically perform or orchestrate performance of code quality assessments at scheduled time periods or time intervals, thereby eliminating a need for human interaction after the initial request. Furthermore, allowing user device 210 to make batch requests for code quality assessments conserves human resources by saving time of the scheduler and conserves device and network resources related to having to generate and transmit multiple, separate requests.

In some implementations, code quality management platform 230 may use one or more natural language processing techniques to process the request. For example, code quality management platform 230 may process (e.g., parse) the request using a natural language processing technique to identify the information included in the request.

In some implementations, code quality management platform 230 may analyze one or more historical requests to verify the request. For example, code quality management platform 230 may analyze the request using one or more natural language processing techniques. In this case, code quality management platform 230 may determine that the request includes one or more terms that code quality management platform 230 is unable to process. Here, code quality management platform 230 may compare information included in the request to one or more historical requests to assign one or more values to the one or more terms that code quality management platform 230 is unable to process, thereby improving performance of code quality management platform 230. Furthermore, code quality management platform 230 may use the one or more values to determine the one or more code quality assessment scores, as described further herein.

As an example, a user may provide a voice request that states "schedule CC of app X in env Y on 11-25-17 at 5." Code quality management platform 230 may analyze the request using a natural language processing technique, and may determine that "CC," "env," and "5" are terms that code quality management platform 230 is unable to process. In this case, code quality management platform 230 may compare the terms to one or more historical requests made by the user to determine that CC is an abbreviation for code coverage, that env is an abbreviation for environment, and that "5" refers to 5 PM (e.g., if all requests made by the user were made at 5 PM, and none at 5 AM, the request likely is intended to mean 5 PM). In this way, code quality management platform 230 is able to use natural language processing and/or historical requests to resolve ambiguities needed to process the request. This may conserve resources of code quality management platform 230 relative to code quality management platform 230 improperly processing a request and/or having to interact with user device 210 to resolve ambiguities.

In this way, code quality management platform 230 is able to receive a request for a code quality assessment.

As further shown in FIG. 4, process 400 may include obtaining authorization to access one or more environments associated with the program and obtaining a set of test classes for the program (block 420). For example, to be able to perform the code quality assessment, code quality management platform 230 may need access to one or more environments that support the program (e.g., a code quality assessment may be performed in each environment of the one or more environments). Additionally, code quality management platform 230 may need to obtain a set of test classes that need to be executed as part of performing the code quality assessment. A test class may include or more lines of program code that may be executed as part of a test case or an element of a test case.

In some implementations, cloud services provider 220 may host one or more environments associated with the program. For example, an environment may be a system and/or network that is used to support a program, such as a development environment, a testing environment, a production environment, and/or the like. An environment may support a program with a particular operating system, with particular system or network resources (e.g., a particular run-time environment, a particular coding language, a particular set of libraries or web services, etc.), and/or the like. In this case, a developer may be able to work on the program in a number of different environments, depending on the task being completed. Additionally, cloud services provider 220 may also save instances of the program at particular intervals, thereby allowing a developer to roll back to a previous instance of the program if the developer encounters problems or errors.

In some implementations, code quality management platform 230 may obtain authorization needed to access an environment associated with the program. For example, code quality management platform 230 may provide an authorization request to cloud services provider 220 (e.g., which may support the environment). In this case, the authorization request may include credential information (e.g., username, password, etc.) for the environment.

Additionally, cloud services provider 220 may execute an authorization procedure to determine whether the credential information matches with credentials needed to access the environment. If the credential information matches with the credentials needed to access the environment, then code quality management platform 230 may receive an authorization response that includes a security token that allows code quality management platform 230 to access the environment. Furthermore, code quality management platform 230 may provide authorization requests to cloud services provider 220 for each environment, of the one or more environments, to allow code quality management platform 230 to receive a security token for each environment.

In some implementations, a data source may store test classes for a set of programs. For example, a data source may store test classes for a set of programs using a data structure, such as a linked-list, an array, a graph, a tree, a database (e.g., a relational database), and/or the like. In some cases, the data source may store multiple iterations of the program, such that a developer is able to roll back to a previous iteration of the program if the developer encounters errors during development or testing.

In some implementations, code quality management platform 230 may obtain a set of test classes associated with the program. For example, code quality management platform 230 may use information included in the request for the code quality assessment as part of a query to obtain the set of test classes from the data source. In this case, the request may include a program identifier, and code quality management platform 230 may use the program identifier to search a data structure for the set of test classes, which may be stored in association with a matching identifier for the program. In some cases, code quality management platform 230 may also provide credential information in addition to the program identifier to obtain the set of test classes associated with the program.

In this way, code quality management platform 230 is able to obtain authorization information and test classes that may be used to perform a code quality assessment for the program.

As further shown in FIG. 4, process 400 may include determining one or more code quality assessment scores by performing the code quality assessment for the program (block 430). For example, code quality management platform 230 may perform the code quality assessment, or may provide the set of test classes to cloud services provider 220 to allow cloud services provider 220 to perform the code quality assessment.

In some implementations, code quality management platform 230 may perform the code quality assessment. For example, code quality management platform 230 may perform the code quality assessment in an environment, of the one or more environments, using a security token associated with the environment and the set of test classes. In this case, code quality management platform 230 may access the environment using the security token, may execute the set of test classes in the environment, and may perform the code quality assessment.

As an example, code quality management platform 230 may perform a code coverage assessment in an environment of the one or more environments. In this case, code quality management platform 230 may access the environment using a security token, and may execute the set of test classes in the environment. While the set of test classes are executing, a code coverage assessment may be performed that determines a percentage of program code that is used during execution of the set of test classes. In this case, the percentage of program code that is used during execution of the set of test classes may be used as a code quality assessment score.

As another example, code quality management platform 230 may perform a cyclomatic complexity assessment in an environment of the one or more environments. In this case, code quality management platform 230 may access the environment using a security token, and may execute the set of test classes in the environment. While the set of test classes are executing, a cyclomatic complexity assessment may be performed that determine a number of linearly independent paths associated with data flow of the program. In this case, the number of linearly independent paths associated with the data flow of the program may be used as a code quality assessment score.

In some implementations, cloud services provider 220 may perform the code quality assessment. For example, code quality management platform 230 may provide, to cloud services provider 220, one or more security tokens needed to access the one or more environments and the set of test classes. In order to interact with cloud services provider 220, code quality management platform 230 may utilize an adaptor that is able to interact with cloud services provider 220 to request the code quality assessment (e.g., using one or more application programming interfaces (APIs)). Additionally, cloud services provider 220 may perform the code quality assessment, and may provide code quality assessment scores back to code quality management platform 230.

In some implementations, code quality management platform 230 may provide requests to perform code quality assessments to multiple cloud services providers 220. For example, assume code quality management platform 230 receives a first request to perform a code quality assessment for a first program and a second request to perform a code quality assessment for a second program, where the first program is supported by one or more environments of a first cloud services provider 220, and where the second program is supported by one or more environments of a second cloud services provider 220. In this case, code quality management platform 230 may utilize an adaptor to make one or more API calls to the first cloud services provider 220 (e.g., one API call per environment), and may utilize the adaptor to make one or more API calls to the second cloud services provider 220. In this way, code quality management platform 230 is able to interact with any cloud services provider 220 that is used to support a particular program. In some implementations, code quality management platform 230 may make a first API call to a first cloud services provider 220, a second API call to a second cloud services provider 220, for one or more environments associated with a single program.

In some implementations, code quality management platform 230 may perform a code quality assessment based on a trigger. For example, if the request is a request to schedule the code quality assessment for a particular time period, code quality management platform 230 may determine that a current time period matches the particular time period, which may trigger performing the code quality assessment. In some implementations, code quality management platform 230 may, based on the trigger, interact with cloud services provider 220 to allow cloud services provider 220 to perform the code quality assessment.

In some implementations, code quality management platform 230 may store one or more code quality assessment scores. For example, code quality management platform 230 may store one or more code quality assessment scores using a data structure to enable logs to be kept of particular code quality assessments that are performed on the program.

In some implementations, code quality management platform 230 may automatically perform a particular type of code quality assessment based on the one or more code quality assessment scores. For example, code quality management platform 230 may determine a first set of code quality assessment scores, and may, if the first set of code quality assessment scores do not satisfy a threshold score, automatically perform another type of code quality assessment. As an example, if a set of code coverage scores do not satisfy a threshold score, then code quality management platform 230 may automatically perform a code duplication assessment. In this example, performance of the code duplication assessment may allow code quality management platform 230 to determine whether duplicated code is leading to a misleading code coverage score (e.g., if a particular function is repeated throughout the program, the code coverage score may be low despite that only the particular function needs to be tested).

Additionally, or alternatively, code quality management platform 230 may modify a deployment state of the program based on the one or more code quality assessment scores. For example, code quality management platform 230 may take the program offline, or bring the program online, depending on the one or more code quality assessment scores. In some cases, code quality management platform 230 may modify the deployment state based on whether the one or more code quality assessment scores satisfy a threshold score.

Additionally, or alternatively, code quality management platform 230 may re-determine the one or more code quality assessment scores. For example, if the one or more code quality scores do not satisfy a threshold value of code quality, then code quality management platform 230 may re-determine the one or more code quality assessment scores to verify that the first determination was accurate. In some cases, code quality management platform 230 may, based on whether the one or more code quality scores satisfy the threshold value of code quality, automatically re-perform the code quality assessment using a different set of test classes.

Additionally, or alternatively, code quality management platform 230 may automatically perform troubleshooting on the program based on the one or more code quality assessment scores. For example, code quality management platform 230 may determine that the one or more code quality assessment scores do not satisfy a threshold level of code quality. In this case, code quality management platform 230 may automatically provide a notification to a developer to perform troubleshooting on the program, or may automatically generate one or more recommended solutions to improve code quality of the program (e.g., such as a recommendation to test additional functions within the program).

Additionally, or alternatively, code quality management platform 230 may automatically generate a new set of test classes and may re-perform a code quality assessment using the new set of test classes. For example, code quality management platform 230 may determine that the one or more code quality assessment scores do not satisfy a threshold level of code quality. In this case, code quality management platform 230 may automatically generate a new set of test classes (e.g., test classes associated with testing currently untested portions of the source code), and may re-perform a code quality assessment using the new set of test classes.

Additionally, or alternatively, code quality management platform 230 may automatically predict a code quality assessment score. For example, code quality management platform 230 may execute a forecasting technique to predict a code quality assessment score. In this case, code quality management platform 230 may use the forecasting technique to analyze historical program code and/or historical code quality assessments to identify a scoring trend, and may predict a code quality assessment score based on the scoring trend. Additionally, code quality management platform 230 may provide a recommendation and/or a notification to user device 210 if a predicted code quality assessment score does not satisfy a threshold. In this way, code quality management platform 230 is able use predicted code quality assessment score to improve overall code quality, prior to spending processing resources performing a code quality assessment.

In this way, code quality management platform 230 is able to determine the one or more code quality assessment scores for the program. Furthermore, by determining code quality assessment scores for multiple environments in a single request, code quality management platform 230 conserves processing resources that might otherwise be used to make individual requests for each environment. Additionally, code quality management platform 230 conserves network resources by reducing single execution instances of test classes that are used for performing the code quality assessment.

As further shown in FIG. 4, process 400 may include providing, to the user device, the one or more code quality assessment scores and/or one or more summary statistics (block 440). For example, code quality management platform 230 may provide, to user device 210, a code quality assessment score for each environment and/or one or more summary statistics. The one or more summary statistics may include a summary of code quality assessment scores for the program (e.g., showing a score for each environment, showing a score for the same environment but for multiple assessments that were made over an interval, etc.), code quality assessment scores for the program in relation to other programs, and/or the like.

In some implementations, code quality management platform 230 may provide the one or more code quality assessment scores to user device 210. In this case, user device 210 may display the one or more code quality assessment scores on a user interface. In this way, a user is able to view a current snapshot of code quality with respect to one or more types of assessments (e.g., the code coverage assessment, the code duplication assessment, the errors detection assessment, the LOC assessment, the cyclomatic complexity assessment, etc.).

In some implementations, code quality management platform 230 may provide the one or more summary statistics to user device 210. In this case, user device 210 may display the one or more summary statistics on the user interface. As an example, the user interface may display a dashboard showing historical code quality assessment scores over an interval (e.g., a month, a day, a year, etc.). As another example, the user interface may display a dashboard showing code quality assessment scores for a set of programs (e.g., such that a developer may view his or her particular progress with respect to code quality in relation to his or her peers). As an example with respect to a code coverage assessment, the user interface may display a dashboard showing a detailed report that includes the following metrics: current code coverage as a percentage, previous code coverage, total LOC, a number of tested LOC, a number of untested LOC, and/or the like.

In some implementations, code quality management platform 230 may provide a notification to user device 210. For example, code quality management platform 230 may provide a notification to user device 210 if a threshold level of code quality is satisfied. As an example, code quality management platform 230 may provide a notification to user device 210 if a code quality assessment score satisfies a threshold level of code quality (or does not satisfy a threshold level of code quality).

In some implementations, code quality management platform 230 may provide a recommendation to user device 210. For example, code quality management platform 230 may determine that a code quality assessment score does not satisfy a threshold level of quality. In this case, code quality management platform 230 may generate a recommendation to create one or more additional test classes for the program, and may provide the recommendation for display on a user interface of user device 210.

In this way, code quality management platform 230 is able to provide one or more code quality assessment scores and/or one or more summary statistics to user device 210.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, code quality management platform 230 conserves processing resources by eliminating a need to process separate requests each time a user needs to have a code quality assessment performed. For example, the user may, in one request, schedule multiple code quality assessments for the program or may schedule code quality assessments for multiple programs, thereby conserving processing resources of code quality management platform 230 that might otherwise be used to process separate requests.

FIGS. 5A-5F provide an example implementation of process 400. In some implementations, one or more processes or features described in FIGS. 5A-5F may be performed by code quality management platform 230. In some implementations, one or more processes or features described in FIGS. 5A-5F may be performed by another device or a group of devices separate from or including code quality management platform 230, such as user device 210 and/or cloud services provider 220.

Figure 5A:
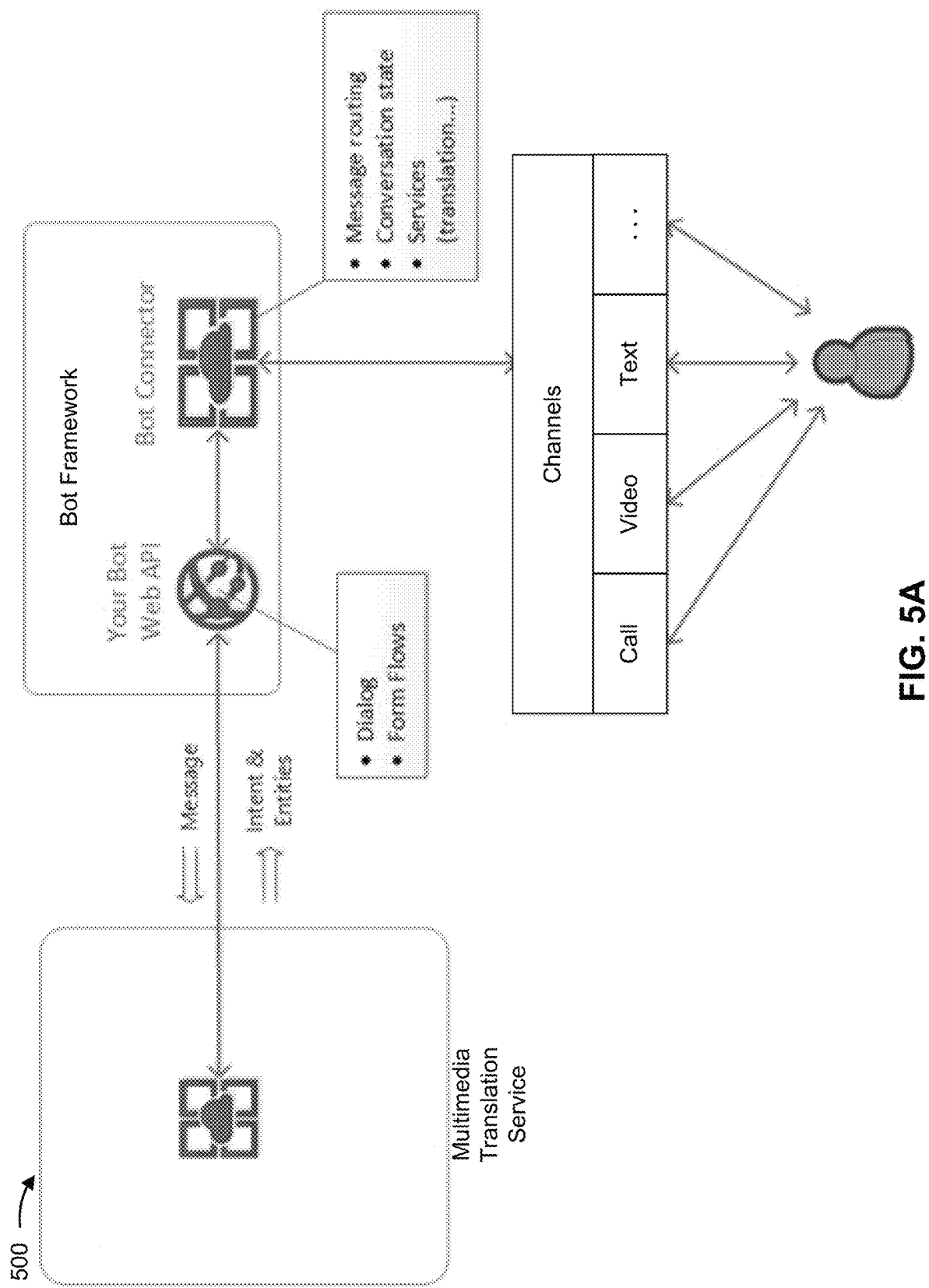
FIGS. 5A-5F are diagrams of an example implementation of the example process described in FIG. 4.

As shown in FIG. 5A, code quality management platform 230 may support a bot framework (e.g., that includes a virtual agent) capable of supporting requests for code quality assessments through a multitude of different mediums or channels. For example, code quality management platform 230 may support requests that are call-based, video-based, text-based, and/or the like.

In some implementations, code quality management platform 230 may interact with a multimedia translation service to convert requests from a first data type to a second data type. For example, code quality management platform 230 may translate a video-based request or a call-based request to a text file for further processing, as described elsewhere herein.

In this way, code quality management platform 230 is able to use a virtual agent to support translation of requests via a multitude of different types of messaging services.

Figure 5B:
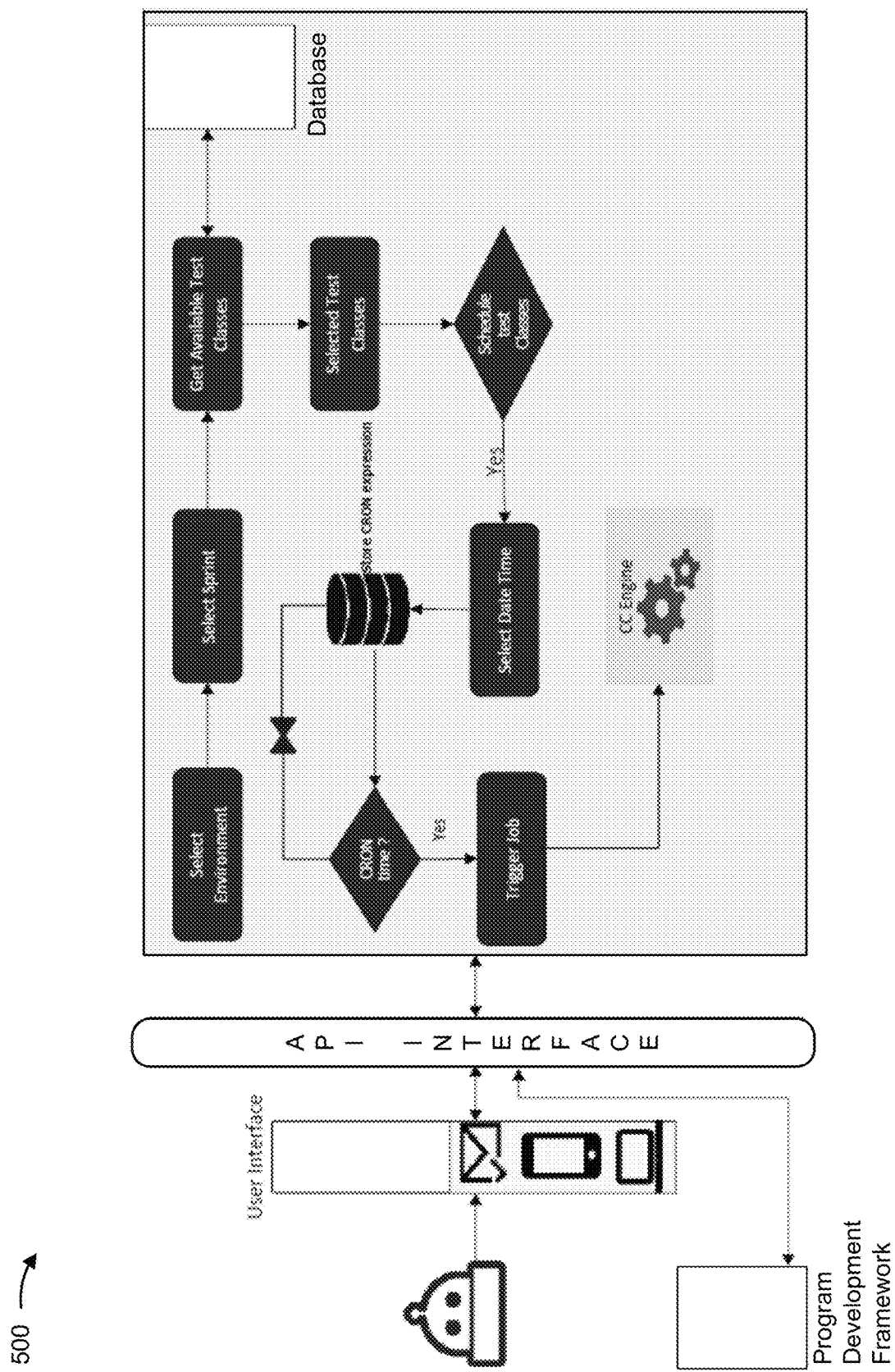

As shown in FIG. 5B, code quality management platform 230 may support scheduling of code quality assessments in multiple environments. For example, code quality management platform 230 may use a scheduler to schedule code quality assessments. In this case, the schedule may identify a time period at which to perform code quality assessments, or may specify a trigger capable of causing automatic execution of code quality assessments (e.g., an expiration of a timer, another user-configurable trigger, etc.). When a scheduled time period occurs (or when a trigger is satisfied), code quality management platform 230 may perform the code quality assessment.

Shown as an example, code quality management platform 230 may perform a code coverage assessment (shown as being performed using a code coverage "CC" engine). In this case, the CC engine may be code quality management platform 230, a component of code quality management platform 230, a technique that code quality management platform 230 may use to perform the code coverage assessment, and/or the like.

As a specific example, an administrator of a system might create a complete annual schedule for code quality assessments. In this case, the code quality assessments may automatically execute throughout the year at each scheduled time period.

In this way, code quality assessments for an organization may be entirely automated and executed without human intervention.

Figure 5C:
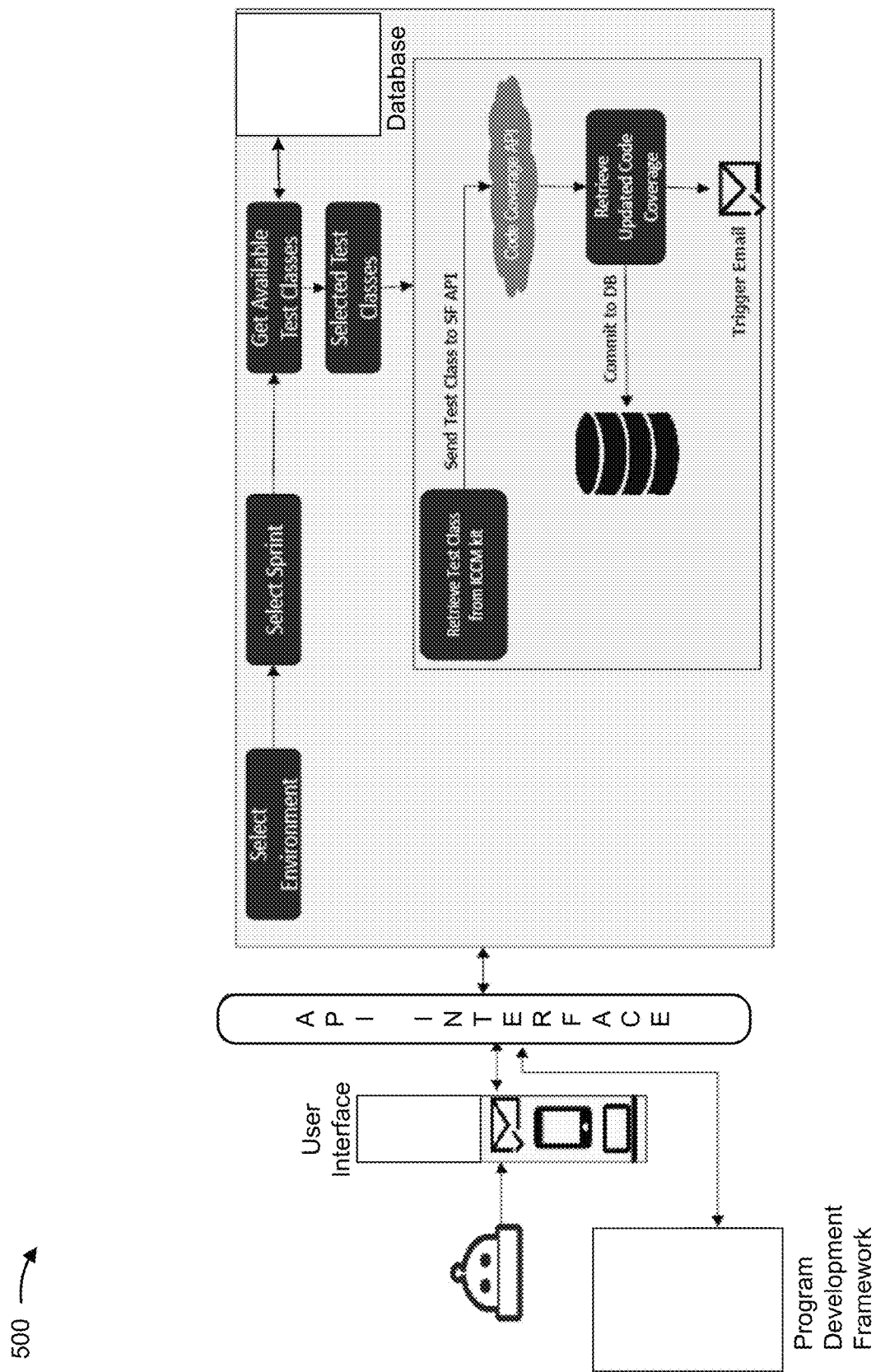

As shown in FIG. 5C, code quality management platform 230 may perform a code quality assessment on test classes in one or more environments. For example, code quality management platform 230 may perform a code quality assessment on test classes to generate code quality assessment scores for the test classes in the one or more environments, and may store the code quality assessment scores using a data structure (e.g., a database).

In some implementations, code quality management platform 230 may perform a code quality assessment on a particular subset of test classes (e.g., a subset of a total amount of test classes associated with a program). In some implementations, code quality management platform 230 may perform a code quality assessment (e.g., internally, using a third-party service with an API, etc.), and may provide a notification (e.g., via an e-mail) to an end-user that the code quality assessment has been performed.

In this way, code quality management platform 230 is able to perform a code quality assessment in multiple environments.

Figure 5D:
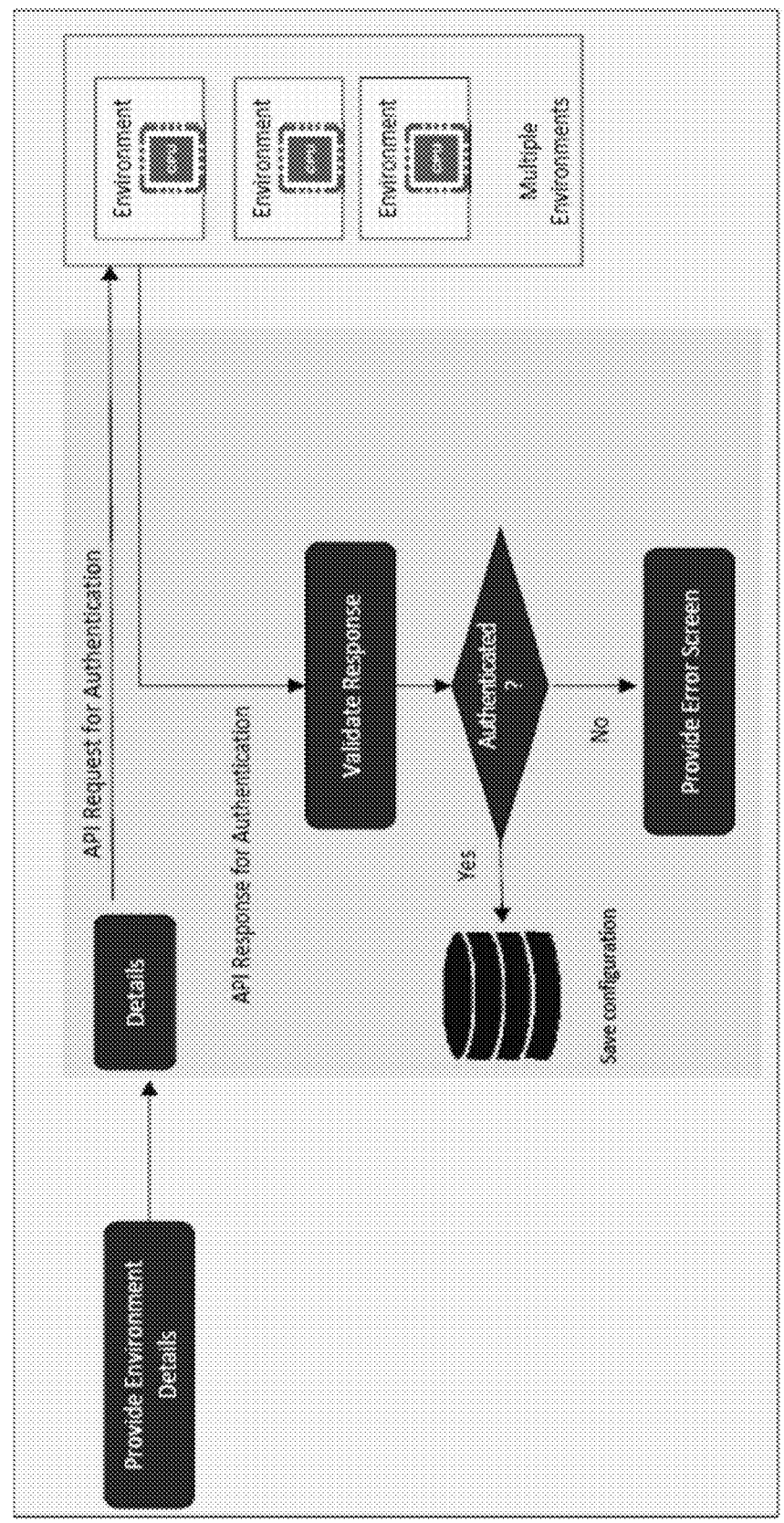

As shown in FIG. 5D, code quality management platform 230 may perform a code quality assessment in multiple environments. For example, an organization may maintain multiple environments to enable a product to be released to market in a short time span. In this case, code quality management platform 230 is able to automatically perform code quality assessments in all (or some) of the environments, thereby allowing the organization to manage code quality in a multiple environments.

In this way, code quality management platform 230 automatically performs code quality assessments in multiple environments, thereby conserving processing resources and/or network resources, and reducing employee involvement in manually performing each code quality assessment.

Figure 5E:
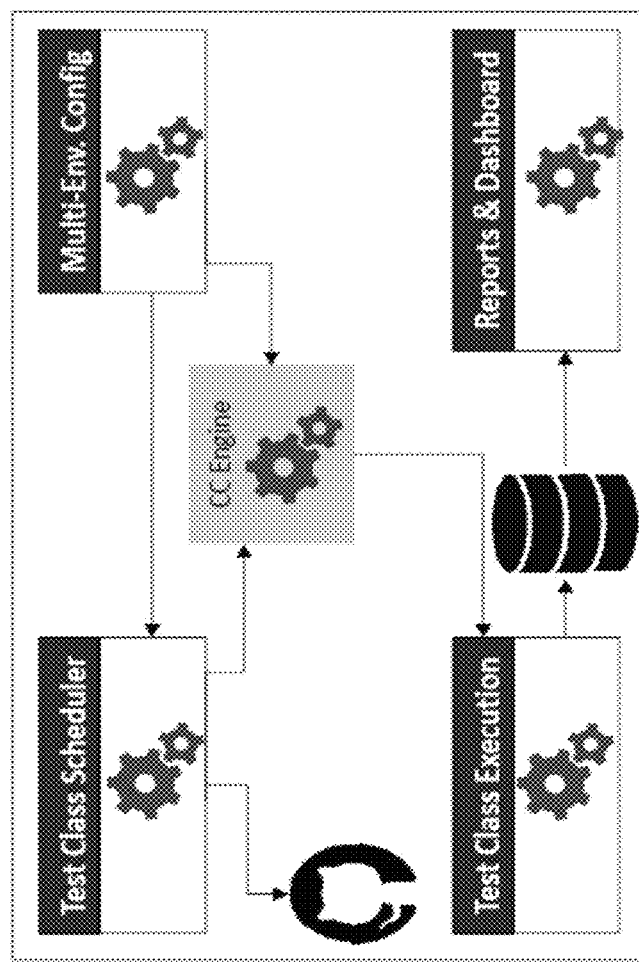
Figure 5E:
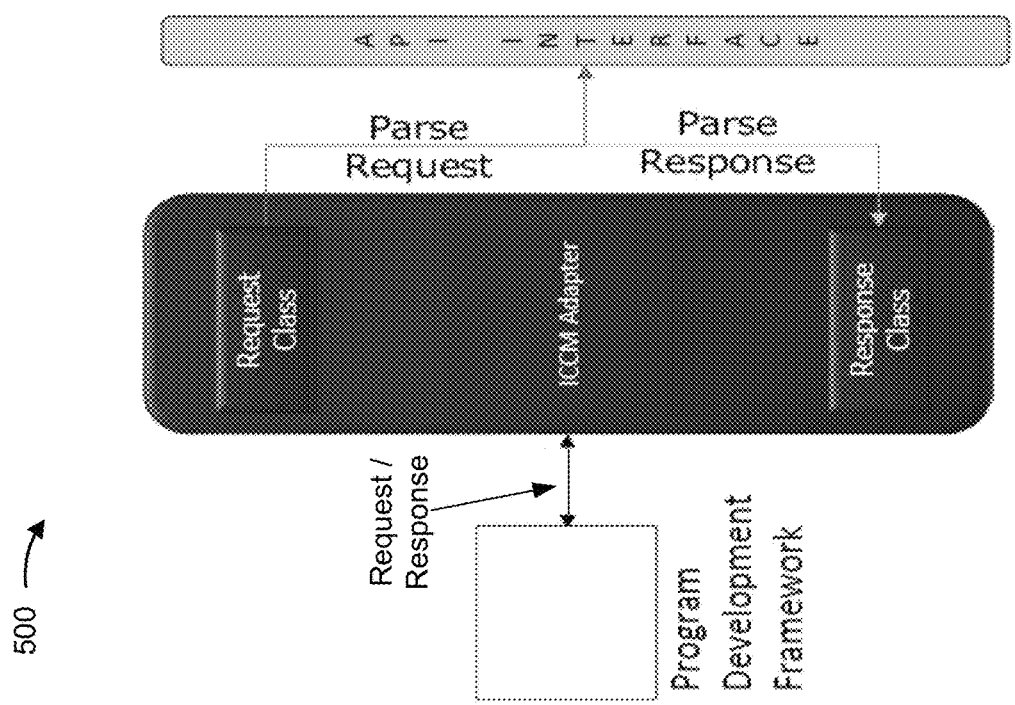

As shown in FIG. 5E, code quality management platform 230 may use an adaptor (shown as an ICCM adaptor) to process requests associated with different program development frameworks. For example, an organization may utilize multiple program development frameworks for program development, and code quality management platform 230 may use an adaptor to interact with APIs associated with each program development framework.

In this way, code quality management platform 230 is able to process requests and responses associated with a number of different types of program development frameworks.

Figure 5F:
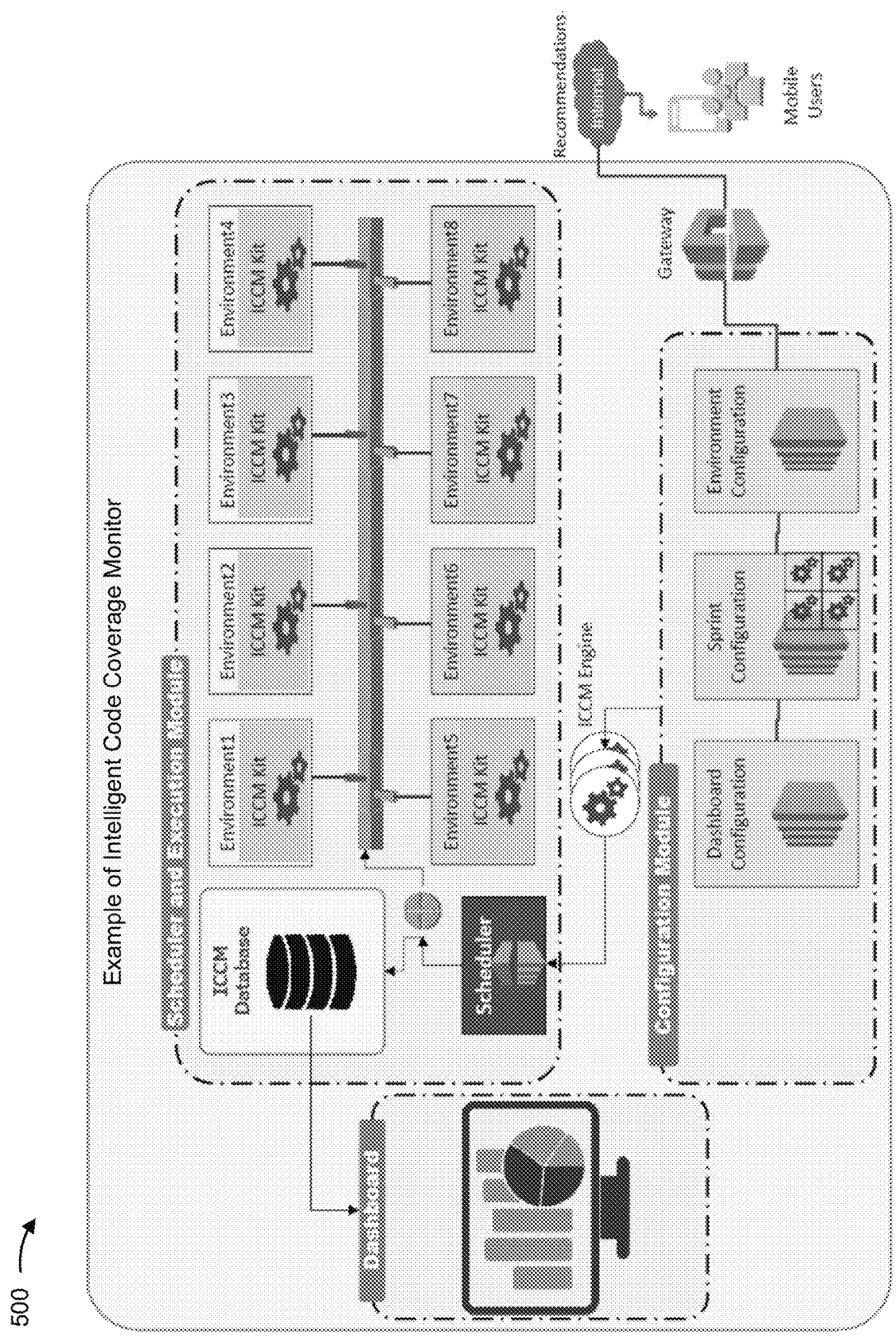

As shown in FIG. 5F, code quality management platform 230 may utilize a scheduler (shown as a scheduler module), a code quality assessment technique (shown as an execution module), and a configuration technique (shown as a configuration module) to process requests for display on a dashboard. For example, code quality management platform 230 may utilize a scheduler module and an execution module that is able to interact with multiple environments (e.g., using ICCM configuration kits) during a scheduled execution time period or time interval. Additionally, a configuration module may be used to specify particular dashboard configuration parameters, sprint configuration parameters, environment configuration parameters, and/or the like.

In this way, code quality management platform 230 is able to utilize modules that manage particular functions associated with code quality assessments.

Although FIGS. 5A-5F show an example implementation of process 400, in some implementations, implementations may exist that are different than those described or depicted in FIGS. 5A-5F.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive, from a user device, a request for a code quality assessment of a program,
the request including:
program identifier information, and
program environment information for a plurality of different environments associated with the program,
the plurality of different environments including at least two of:
a development environment,
a testing environment, or
a production environment;
obtain, using the program environment information, authorization to access the plurality of different environments associated with the program, where the one or more processors, when obtaining the authorization, are to obtain a set of tokens that are associated with the plurality of different environments;
obtain, using the program identifier information, a set of test classes for the program compatible with the plurality of different environments;
determine a plurality of code quality assessment scores corresponding to the plurality of different environments by performing the code quality assessment for the program,
where the one or more processors, when performing the code quality assessment, are to:
access the plurality of different environments using the set of tokens,
execute the set of test classes in each environment of the plurality of different environments,
the set of test classes being concurrently executed in at least two of the plurality of different environments, and
determine a code quality assessment score for the program in each environment of the plurality of different environments;
provide the plurality of code quality assessment scores to the user device; and
automatically perform a code duplication assessment for the program when at least one of the plurality of code quality assessment scores do not satisfy a threshold score,
the code duplication assessment assessing whether a function of the program is repeated.

2. The device of claim 1, where the code quality assessment is a code coverage assessment.

3. The device of claim 1, where the request further includes at least one of:
information indicating a type of code quality assessment, or
time information indicating when to perform the code quality assessment.

4. The device of claim 1, where the one or more processors, when receiving the request for the code quality assessment, are to:
receive the request from the user device,
where the request is made using:
a messaging service that supports text-based messages,
a messaging service that supports voice messages, or
a messaging service that supports media messages.

5. The device of claim 1, where the one or more processors are further to:
determine, after receiving the request, that the request is of a first data type;
provide the request to a server device to cause the server device to convert the request from the first data type to a second data type,
where the second data type is in a format capable of being processed; and
receive, from the server device, the request that has been converted to the second data type.

6. The device of claim 1, where the one or more processors, when receiving the request for the code quality assessment, are to:
receive time information indicating that the code quality assessment is to be performed on each environment, of the plurality of different environments, at particular time periods; and
where the one or more processors, when determining the plurality of code quality assessment scores, are to:
determine that a current time period matches a time period of the particular time periods,
access an environment, of the plurality of different environments, using a token associated with the environment of the plurality of different environments,
execute the set of test classes in the environment of the plurality of different environments, and
determine a first code quality assessment score for the program in the environment of the plurality of different environments.

7. The device of claim 1, where the one or more processors, when providing the plurality of code quality assessment scores to the user device, are to:
provide the plurality of code quality assessment scores for display on a user interface of the user device; and
where the one or more processors are further to:
provide one or more summary statistics for display on the user interface,
the one or more summary statistics to provide historical code quality assessment scores for the program.

8. A non-transitory computer-readable medium storing instructions, the instructions comprising:
one or more instructions that, when executed by one or more processors, cause the one or more processors to:
receive, from a user device, a request for a code quality assessment of a program;
obtain, using information included in the request, authorization to access a plurality of different environments associated with the program by obtaining one or more tokens that are associated with the plurality of different environments,
the plurality of different environments including at least two of:
a development environment,
a testing environment, or
a production environment;
obtain, using information included in the request, a set of test classes for the program compatible with the plurality of different environments;
provide the one or more tokens for the plurality of different environments and the set of test classes to a server device to permit the server device to use the one or more tokens to access the plurality of different environments;
execute the set of test classes in each environment of the plurality of different environments,
the set of test classes being concurrently executed in at least two of the plurality of different environments;
determine a plurality of code quality assessment scores for the program corresponding to each of the plurality of different environments, and output the plurality of code quality assessment scores for the program;
receive the plurality code quality assessment scores;
provide the plurality of code quality assessment scores to the user device; and
automatically perform a code duplication assessment for the program when at least one of the plurality of code quality assessment scores do not satisfy a threshold score,
the code duplication assessment assessing whether a function of the program is repeated.

9. The non-transitory computer-readable medium of claim 8, where the code quality assessment is at least one of:
a code coverage assessment,
a code errors detection assessment, or
a cyclomatic complexity assessment.

10. The non-transitory computer-readable medium of claim 8, where the one or more tokens are a plurality of tokens.

11. The non-transitory computer-readable medium of claim 8, where the one or more instructions, that cause the one or more processors to receive the request for the code quality assessment, cause the one or more processors to:
receive the request from the user device via a messaging service,
where the messaging service is:
a messaging service that supports text-based messages,
a messaging service that supports voice messages, or
a messaging service that supports media messages.

12. The non-transitory computer-readable medium of claim 8, where the one or more instructions, when executed by the one or more processors, further cause the one or more processors to:
determine, after receiving the request, that the request is of a first data type; and
convert the request from the first data type to a second data type,
where the second data type is in a format capable of being processed by the one or more processors.

13. The non-transitory computer-readable medium of claim 8, where the one or more instructions, when executed by the one or more processors, further cause the one or more processors to:
determine, after receiving the plurality of code quality assessment scores for the program, that a code quality assessment score, of the one or more code quality assessment scores, does not satisfy a threshold level of quality;
generate a recommendation to create one or more additional test classes for the program; and provide the recommendation for display on a user interface of the user device.

14. A method, comprising:
receiving, by a device and from a user device, a request for one or more code quality assessments of a program;
obtaining, by the device and by using information included in the request, authorization to access a plurality of different environments associated with the program,
the plurality of different environments including at least two of:
a development environment,
a testing environment, or
a production environment,
where obtaining the authorization includes obtaining one or more tokens that are associated with the plurality of different environments;
obtaining, by the device and by using information included in the request, a set of test classes for the program compatible with the plurality of different environments;
determining, by the device, a plurality of code quality assessment scores by performing, for the program, a code quality assessment of the one or more code quality assessments,
where performing the code quality assessment includes:
accessing the plurality of different environments using the one or more tokens,
executing the set of test classes in each environment of the plurality of different environments,
the set of test classes being concurrently executed in at least two of the plurality of different environments, and
determining a code quality assessment score corresponding to each of the plurality of different environments;
providing, by the device, the plurality of code quality assessment scores to the user device; and
automatically performing, by the device, a code duplication assessment for the program when at least one of the plurality of code quality assessment scores do not satisfy a threshold score,
the code duplication assessment assessing whether a function of the program is repeated.

15. The method of claim 14, where a code quality assessment, of the one or more code quality assessments, is a code coverage assessment.

16. The method of claim 14, where the one or more tokens are a plurality of tokens.

17. The method of claim 14, where receiving the request for the one or more code quality assessments comprises:
receiving the request from the user device,
where the request is made using a messaging service that supports audio messages or using a messaging service that supports media messages; and
where the method further comprises:
determining, after receiving the request, that the request is of a first data type; and
converting the request from the first data type to a second data type,
where the second data type is in a format capable of being processed by the device.

18. The method of claim 14, where receiving the request for the one or more code quality assessments comprises:
receiving the request from the user device,
the request including time information indicating one or more particular time periods at which the one or more requested code quality assessments are to be performed; and
the method further comprising:
determining that a current time period matches a particular time period of the one or more particular time periods; and
determining, for a particular code quality assessment of the one or more requested code quality assessments, a code quality assessment score for each environment, of the plurality of different environments, based on determining that the current time period matches the particular time period.

19. The method of claim 14, further comprising:
analyzing the request using a natural language processing technique,
determining that the request includes one or more terms that the device is unable to process based on analyzing the request,
comparing information included in the request to one or more historical requests to assign one or more values to the one or more terms that the device is unable to process,
where the device is able to process the one or more values; and
where determining the plurality of code quality assessment scores comprises:
using the one or more values to determine the plurality of code quality assessment scores.

20. The method of claim 14, where providing the plurality of code quality assessment scores comprises:
providing the plurality of code quality assessment scores for display on a user interface of the user device, and
providing, for display on the user interface, a notification indicating that the plurality of code quality assessment scores do not satisfy a threshold level of quality.

* * * * *